No. 764,947. Patented July 12, 1904.

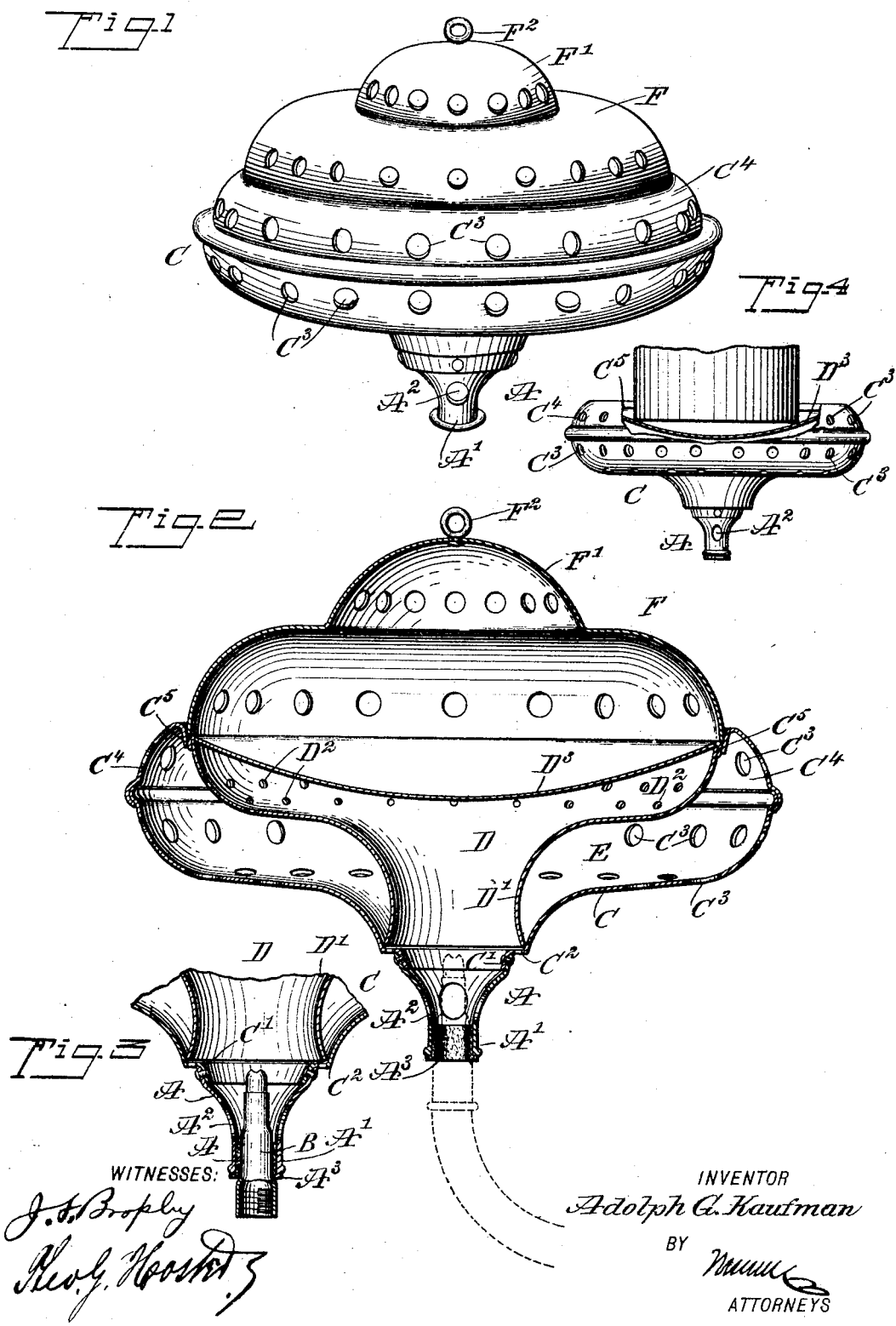

UNITED STATES PATENT OFFICE.

ADOLPH G. KAUFMAN, OF NEW YORK, N. Y.

HEATER.

SPECIFICATION forming part of Letters Patent No. 764,947, dated July 12, 1904.

Application filed October 10, 1903. Serial No. 176,483. (No model.)

*To all whom it may concern:*

Be it known that I, ADOLPH G. KAUFMAN, a citizen of the United States, and a resident of the city of New York, borough of Manhattan, in the county and State of New York, have invented a new and Improved Heater, of which the following is a full, clear, and exact description.

The invention relates to heaters, radiators, and stoves for heating rooms, vessels, and the like and adapted to be attached to gas-burners.

The object of the invention is to provide a new and improved heater which is simple and durable in construction, cheap to manufacture, easily applied, and arranged to produce complete combustion and a rapid circulation and heating of the air in the room to insure quick heating thereof or to allow of heating culinary and other vessels set on the heater, the consumption of gas by the heater being very economical and the flame being confined within the heater, thus preventing accidental fires.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a perspective view of the improvement. Fig. 2 is a sectional side elevation of the same. Fig. 3 is a sectional side elevation of the entrance end of the improvement as applied to a gas-burner; and Fig. 4 is a reduced side elevation of the improvement, parts being broken out, the hood removed, and a vessel to be heated shown in place.

The nozzle A of the heater has its contracted lower or apex end $A'$ of a size and shape to snugly fit onto a gas-burner B, so that the tip thereof extends approximately to the upper or base portion of the nozzle, as plainly indicated in Fig. 3. The side wall of the nozzle A is provided with openings $A^2$ for the entrance of air to insure proper mixing of the gas issuing from the burner B, and the said nozzle is provided with a packing-ring $A^3$, of asbestos or the like, to insure a snug fit between the nozzle and the burner and to prevent escape of heat at the junction and heating of the burner-fixture.

The base or upper end of the nozzle A is rigidly connected by rivets or the like with a shell C, the side wall of which is formed in ogee shape, and the lower or apex end of the shell is provided with an annular flange $C'$, riveted to the base end of the nozzle A, as plainly indicated in Figs. 2 and 3. The flange $C'$ extends from a horizontally-disposed annular seat $C^2$, having perforations for the entrance of air, and the side wall of the shell is provided with perforations $C^3$ for the passage of the air and the exit of the heat, as hereinafter more fully described. The top $C^4$ of the shell is preferably made in a separate piece from the body of the shell and is curved upwardly and inwardly and likewise provided with perforations $C^3$, and from the upper edge of the top $C^4$ extends inwardly and downwardly an annular flange $C^5$.

Within the shell C described is arranged a mixing-chamber D, also preferably having its side wall $D'$ in the shape of an ogee curve, as plainly indicated in Fig. 2, and the lower contracted end of this mixing-chamber D is seated on the seat $C^2$ at the junction with the side wall of the shell, so that the perforations in the seat $C^2$ open into the lower end of the mixing-chamber D, into which also opens the base end of the nozzle A and the tip of the burner B. The side wall $D'$ is provided in its upper portion with small burner-apertures $D^2$, and the top $D^3$ of the mixing-chamber D is curved downwardly, so as to form a deflector to evenly spread the mixture in the upper portion of the mixing-chamber, to cause the mixture to pass freely through the apertures $D^2$ into the combustion-chamber E, formed between the side wall $D'$ of the mixing-chamber and the side wall of the shell C. The upper end of the mixing-chamber D fits snugly onto the flange $C^5$ of the top $C^4$ of the shell C, so that the top $D^3$ closes the shell at the top.

By having the mixture of gas and air passing through the apertures $D^2$ into the combustion-chamber E to be burned therein it is evident that the air entering this combustion-chamber by way of the perforations $C^3$ insures a perfect combustion of the mixture, and hence the production of a large amount of heat to cause a quick and proper heating of the room in which the heater is located.

By having the combustion-chamber E arranged as described it is evident that the flame is inclosed, and hence the heater is rendered absolutely safe against fire and explosions.

By mixing the gas and air in the nozzle A and directing separate streams of air into the mixture by way of the openings in the seat $C^2$ at the beginning of the mixing-chamber D an exceedingly highly combustible mixture is obtained, which when burning in the combustion-chamber E, with air passing into the combustion-chamber by way of the openings $C^3$, produces an intense heat without the formation of soot or causing an odious smell of unconsumed gases.

The mixture of gas and air burns in the combustion-chamber with a blue flame at all times, and in case the flame should pass out of the openings $C^3$ it simply indicates that too much gas passes into the nozzle A, and the supply of gas can then be readily reduced by the operator turning the gas-cock in the gas-supply correspondingly.

If desired, culinary and other vessels may be set on the top $D^3$ of the mixing-chamber D, and in doing so an air-space is formed between the flat bottom of the vessel (see Fig. 4) and the concave upper surface of the top $D^3$, and hence the air confined in the said space is highly heated, and thereby heats the vessel more rapidly than if the said top were flat. Besides, the concave top provides a larger heating-surface, and a flat-bottom vessel set on the said top (see Fig. 4) forms only a line contact with the top, thus preventing an undue cooling of the said top when the cold vessel is placed in position, and the tendency to cool off the portion of the top covered by the bottom of the vessel is reduced to a minimum.

If desired, a hood F may be set on the top, as illustrated in Figs. 1 and 2, the hood F having a central dome F', provided with a handle $F^2$ for conveniently placing the hood in position on the heater or removing it therefrom whenever it is desired to do so. The hood F and its dome F' are perforated to insure a circulation of the air in the room through the hood, thus increasing the heating capacity of the heater.

By the arrangement described the mixture of gas and air in the mixing-chamber D is readily deflected or spread to the exit-openings $D^2$, and the air entering the perforations in the seat $C^2$ assists in the mixing and spreading of the mixture and its passage through the exit-openings $D^2$ into the combustion-chamber E.

By the peculiar shape given to the shell and the side wall of the combustion-chamber a large combustion-chamber is produced through which the air can readily circulate owing to the perforations $C^3$ extending clear to the top $C^4$ from the middle or horizontal portion of the side wall of the shell.

In case any soot should form in the heater it is not liable to blow out in the room, as the shell prevents such action.

Having thus described my invention, I claim as new and desire to secure by Letters Patent—

1. A heating device comprising a mixing-chamber formed in its side wall with apertures, and a combustion-chamber exteriorly around the said side wall of the mixing-chamber, the said combustion-chamber being formed by an apertured shell, the top and bottom of which are closed by the said mixing-chamber, as set forth.

2. A heating device comprising a mixing-chamber having a reduced central inlet, a perforated side wall and an inwardly-curved top forming a deflector for the mixture of gas and air, and an apertured shell surrounding the said side wall, and having its top and bottom closed by the said mixing-chamber, to form with the said side wall an inclosed combustion-chamber, as set forth.

3. A heating device comprising a nozzle for connection with a gas-supply and having apertures in its side, for the entrance of air, a mixing-chamber having a reduced central inlet connected with the said nozzle, the said mixing-chamber having a perforated side wall and an inwardly-curved top forming a deflector for deflecting the mixture of gas and air rising in the mixing-chamber toward the apertured side wall of the mixing-chamber, and an apertured shell surrounding the said side of the mixing-chamber and having its top and bottom closed by the said mixing-chamber, to form with the said side a combustion-chamber, as set forth.

4. A heating device comprising a nozzle for connection with a gas-supply and having apertures in its side, for the entrance of air, a mixing-chamber having a reduced central inlet connected with the said nozzle, the said mixing-chamber having a perforated side wall and an inwardly-curved top forming a deflector for deflecting the mixture of gas and air rising in the mixing-chamber toward the apertured side wall of the mixing-chamber, and an apertured shell surrounding the said side of the mixing-chamber and forming with the latter a combustion-chamber, the said shell terminating at its apex end in an annular seat having perforations for the admission of air to the reduced central inlet of the mixing-chamber, as set forth.

5. A heating device comprising a nozzle for connection with a gas-supply and having apertures in its side, for the entrance of air, a mixing-chamber having a reduced central inlet connected with the said nozzle, the said mixing-chamber having a perforated side wall and an inwardly-curved top forming a deflector for deflecting the mixture of gas and air rising in the mixing-chamber toward the apertured side wall of the mixing-chamber, and an apertured shell surrounding the said side of the mixing-chamber and forming with the latter a combustion-chamber, the said shell terminating at its apex end in an annular seat having perforations for the admission of air to the reduced central inlet of the mixing-chamber, the top of the latter fitting the upper end of the shell, to close the same at the top, as set forth.

6. A heating device comprising a nozzle for connection with a gas-supply and having apertures in its side, for the entrance of air, a mixing-chamber having a reduced central inlet connected with the said nozzle, the said mixing-chamber having a perforated side wall and an inwardly-curved top forming a deflector for deflecting the mixture of gas and air rising in the mixing-chamber toward the apertured side wall of the mixing-chamber, and an apertured shell surrounding the said side of the mixing-chamber and forming with the latter a combustion-chamber, the said shell terminating at its apex end in an annular seat having perforations for the admission of air to the reduced central inlet of the mixing-chamber, the said seat being attached to the base end of the nozzle, as set forth.

7. A heating device comprising a mixing-chamber formed in its side wall with apertures, a combustion-chamber exteriorly around the said side wall of the mixing-chamber and closed at the top and bottom by the said mixing-chamber, and a perforate hood on the top of the said mixing-chamber and the said combustion-chamber, as set forth.

8. A heating device comprising a nozzle for connection with a gas-supply and having apertures in its side, for the entrance of air, a mixing-chamber having a reduced central inlet connected with the said nozzle, the said mixing-chamber having a perforated side wall and an inwardly-curved top forming a deflector for deflecting the mixture of gas and air rising in the mixing-chamber toward the apertured side wall of the mixing-chamber, an apertured shell surrounding the said side of the mixing-chamber and forming with the latter a combustion-chamber, and a perforate hood removably held on the top of the mixing-chamber to form an air-heating chamber for the circulation and heating of the air in the room, as set forth.

In testimony whereof I have signed my name to this specification in the presence of two subscribing witnesses.

ADOLPH G. KAUFMAN.

Witnesses:
   THEO. G. HOSTER,
   JNO. M. RITTER.